US012051312B2

(12) United States Patent
Gadonniex et al.

(10) Patent No.: US 12,051,312 B2
(45) Date of Patent: Jul. 30, 2024

(54) CORRUGATED BUG SCREEN (71) Applicant: Carrier Corporation, Palm Beach Gardens, FL (US)

(72) Inventors: Dennis Gadonniex, Bradenton, FL (US); Peter Bushnell, Cazenovia, NY (US); Kenneth Mott, Colorado Springs, CO (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 275 days.

(21) Appl. No.: 17/665,082

(22) Filed: Feb. 4, 2022

(65) Prior Publication Data
US 2022/0246010 A1 Aug. 4, 2022

Related U.S. Application Data (60) Provisional application No. 63/145,809, filed on Feb. 4, 2021.

(51) Int. Cl.
*G08B 17/113* (2006.01)
*A01M 29/34* (2011.01)

(52) U.S. Cl.
CPC .......... *G08B 17/113* (2013.01); *A01M 29/34* (2013.01)

(58) Field of Classification Search
CPC .............................. G08B 17/113; A01M 29/34
USPC ........................................................ 220/730
See application file for complete search history.

(56) References Cited

U.S. PATENT DOCUMENTS

| 3,561,604 | A | | 2/1971 | Yotsumoto | |
|---|---|---|---|---|---|
| 4,619,675 | A | | 10/1986 | Watanabe | |
| 4,672,217 | A | * | 6/1987 | Dobrzanski | G08B 29/145 340/630 |
| 5,400,014 | A | * | 3/1995 | Behlke | G08B 17/107 340/630 |

(Continued)

FOREIGN PATENT DOCUMENTS

| CN | 208298360 U | 12/2018 |
|---|---|---|
| EP | 0569712 A1 | 11/1993 |

(Continued)

OTHER PUBLICATIONS

Search Report issued in European Patent Application No. 22154848.0; Date of Mailing Jun. 9, 2022 (9 pages).

*Primary Examiner* — J. Gregory Pickett
*Assistant Examiner* — Niki M Eloshway
(74) *Attorney, Agent, or Firm* — CANTOR COLBURN LLP (57) ABSTRACT

A detection chamber assembly of a smoke detector is provided. The detection chamber assembly includes upper and lower covers, louvers and a corrugated bug screen. The louvers are arranged with the upper and lower covers to define a chamber bound between the upper and lower covers and the louvers. The louvers include a first pair of louvers defining a first space therebetween to permit fluidic ingress to the chamber and a second pair of louvers defining a second space therebetween to permit fluidic ingress to the chamber. The second space is wider than the first space. The corrugated bug screen includes a body disposed about the louvers and a mesh corrugation feature coupled to the body at the second space to permit fluidic ingress to the chamber at the second space and to inhibit bug ingress to the chamber at the second space.

13 Claims, 6 Drawing Sheets

(56) References Cited

U.S. PATENT DOCUMENTS

| | | | | |
|---|---|---|---|---|
| 6,057,774 A * | 5/2000 | Venzant | ............... | G08B 17/113 |
| | | | | 340/630 |
| 6,099,608 A | 8/2000 | Harms et al. | | |
| 6,195,014 B1 | 2/2001 | Sakurai et al. | | |
| 6,911,144 B2 | 6/2005 | Van Pelt et al. | | |
| 7,167,099 B2 | 1/2007 | Kadwell et al. | | |
| 10,512,875 B2 | 12/2019 | Bansal et al. | | |
| 11,069,224 B1 * | 7/2021 | Hsieh | ................... | G08B 29/183 |
| 11,359,941 B1 * | 6/2022 | Futran | ................... | G08B 17/113 |
| 2002/0089426 A1 * | 7/2002 | Qualey, III | .......... | G08B 17/107 |
| | | | | 340/630 |
| 2002/0154018 A1 * | 10/2002 | Nishikawa | ............. | G08B 17/06 |
| | | | | 340/630 |
| 2016/0023375 A1 | 1/2016 | Uram | | |
| 2017/0169682 A1 * | 6/2017 | Bressanutti | .......... | G08B 17/107 |
| 2020/0388127 A1 | 12/2020 | Lee et al. | | |

FOREIGN PATENT DOCUMENTS

| | | | | |
|---|---|---|---|---|
| EP | 1049059 A2 | 11/2000 | | |
| GB | 2270157 A * | 3/1994 | ........... | G08B 17/107 |
| GB | 2309080 A * | 7/1997 | ........... | G08B 17/107 |
| GB | 2359354 A | 8/2001 | | |
| JP | 2006267128 A | 10/2006 | | |
| KR | 101098326 B1 | 12/2011 | | |
| KR | 101275822 B1 | 6/2013 | | |
| WO | 2010120043 A1 | 10/2010 | | |
| WO | WO-2019142797 A1 * | 7/2019 | ............. | G01N 21/53 |
| WO | 2019217579 A1 | 11/2019 | | |
| WO | 2020018815 A1 | 1/2020 | | |

* cited by examiner

CORRUGATED BUG SCREEN

CROSS-REFERENCE TO RELATED APPLICATIONS

This application claims the benefit of U.S. Application No. 63/145,809 filed Feb. 4, 2021, the disclosure of which is incorporated herein by reference in its entirety.

BACKGROUND

The present disclosure relates to smoke detectors and, in particular, to a corrugated bug screen for smoke detector applications.

In photo-electric type smoke detectors, it is typically important to prevent insects from entering a smoke or detection chamber and creating a false signal. This is often done with a mesh screen that surrounds the air flow openings of the smoke or detection chamber. Conventional mesh bug screens are designed in such a way that they inhibit air flow behavior and in turn limit smoke entry (which may affect the ability of the smoke detector to accurately detect the presence of smoke).

Typically, the mesh bug screen is formed into a uniform, cylindrical shape to circumferentially surround a uniform, cylindrical air flow structure (e.g., a detection chamber) of a smoke detector.

BRIEF DESCRIPTION

According to an aspect of the disclosure, a detection chamber assembly of a smoke detector is provided. The detection chamber assembly includes upper and lower covers, louvers and a corrugated bug screen. The louvers are arranged with the upper and lower covers to define a chamber bound between the upper and lower covers and the louvers. The louvers include a first pair of louvers defining a first space therebetween to permit fluidic ingress to the chamber and a second pair of louvers defining a second space therebetween to permit fluidic ingress to the chamber. The second space is wider than the first space. The corrugated bug screen includes a body disposed about the louvers and a mesh corrugation feature coupled to the body at the second space to permit fluidic ingress to the chamber at the second space and to inhibit bug ingress to the chamber at the second space.

In accordance with additional or alternative embodiments, the louvers include multiple second pairs of louvers, each respectively defining second spaces therebetween and the corrugated bug screen includes multiple mesh corrugation features. Each respective mesh corrugation feature is coupled at corresponding ones of the multiple second spaces.

In accordance with additional or alternative embodiments, the mesh corrugation feature includes a tip and first and second tapered sidewalls extending from the tip to the body.

In accordance with additional or alternative embodiments, the mesh corrugation feature permits fluidic ingress to the chamber in a first direction through the tip and in second and third directions through the first and second tapered sidewalls, respectively.

In accordance with additional or alternative embodiments, the mesh-corrugation feature includes a columnar lattice structure at the tip and a row-columnar lattice structure at the first and second tapered sidewalls.

In accordance with additional or alternative embodiments, the mesh corrugation feature extends inwardly toward the chamber.

In accordance with additional or alternative embodiments, the mesh corrugation feature extends outwardly from the chamber.

According to an aspect of the disclosure, a detection chamber assembly of a smoke detector is provided and includes upper and lower covers, louvers and a corrugated bug screen. The louvers are arranged with the upper and lower covers to define a chamber bound between the upper and lower covers and the louvers. The louvers include a first pair of louvers defining a first space therebetween to permit fluidic ingress to the chamber and a second pair of louvers defining a second space therebetween to permit fluidic ingress to the chamber. The second space is wider than the first space. The corrugated bug screen is supported on the second pair of louvers at the second space to permit fluidic ingress to the chamber and to inhibit bug ingress to the chamber.

In accordance with additional or alternative embodiments, the louvers include multiple second pairs of louvers, each respectively defining second spaces therebetween, and each second space including one corrugated bug screen.

In accordance with additional or alternative embodiments, the mesh corrugation bug screen feature is supported in slots defined in each of the second pair of louvers.

In accordance with additional or alternative embodiments, the corrugated bug screen includes a curved body.

In accordance with additional or alternative embodiments, the corrugated bug screen permits fluidic ingress to the chamber in multiple directions normal to corresponding sections of the curved body.

In accordance with additional or alternative embodiments, the corrugated bug screen includes a row-columnar lattice structure.

In accordance with additional or alternative embodiments, the corrugated bug screen extends inwardly toward the chamber.

In accordance with additional or alternative embodiments, the corrugated bug screen extends outwardly from the chamber.

According to an aspect of the disclosure, a smoke detector is provided and includes a housing defining an interior in which a detection chamber assembly is operably disposed. The detection chamber assembly includes upper and lower covers, louvers and a corrugated bug screen. The louvers are arranged with the upper and lower covers to define a chamber bound between the upper and lower covers and the louvers. The louvers include a first pair of louvers defining a first space therebetween to permit fluidic ingress to the chamber and a second pair of louvers defining a second space therebetween to permit fluid ingress to the chamber. The second space is wider than the first space. The corrugated bug screen is disposed at the second space to permit fluidic ingress to the chamber and to inhibit bug ingress to the chamber.

In accordance with additional or alternative embodiments, the corrugated bug screen includes a body disposed about the louvers and a mesh corrugation feature coupled to the body at the second space and extending inwardly toward the chamber.

In accordance with additional or alternative embodiments, the corrugated bug screen includes a body disposed about the louvers and a mesh corrugation feature coupled to the body at the second space and extending outwardly from the chamber while remaining within the interior of the external structure.

In accordance with additional or alternative embodiments, the corrugated bug screen is supported on the second pair of louvers at the second space and extends inwardly toward the chamber.

In accordance with additional or alternative embodiments, the corrugated bug screen is supported on the second pair of louvers at the second space and extends outwardly from the chamber while remaining within the interior of the external structure.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As will be described below, a detection chamber assembly incorporating a corrugated bug screen and a smoke detector incorporating the detection chamber assembly are provided. The bug screen is formed into a corrugated shape with indentations and other geometric features designed to trap air and improve smoke entry. The corrugated shape can at least partially take the form of a star or be a mostly cylindrical shape with areas of corrugation that fit into or around open areas of an optical cover of the detection chamber assembly. It can also take the form of a partial mesh structure that covers large openings of the optical cover (e.g., where the corrugation may extend into the interior of the optical cover, between louvers).

Figure 1:
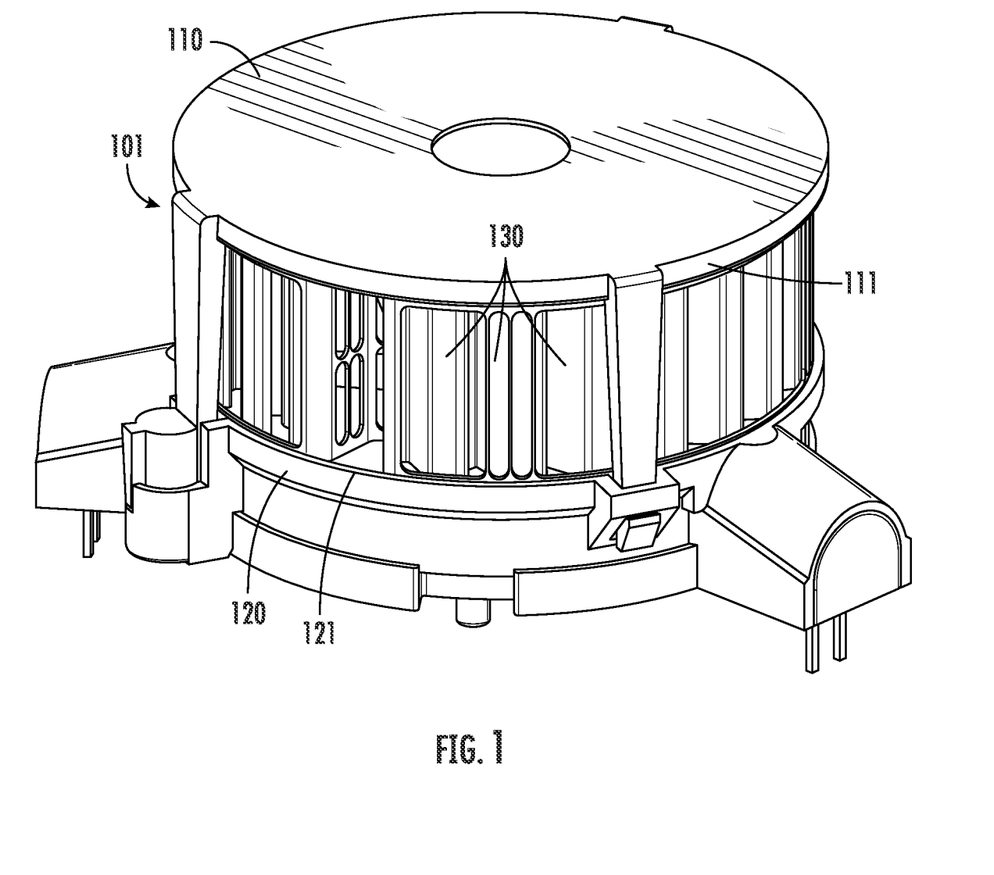
FIG. 1 is a perspective view of an exemplary detection chamber assembly for a photo-electric smoke detector in accordance with embodiments.
Figure 2:
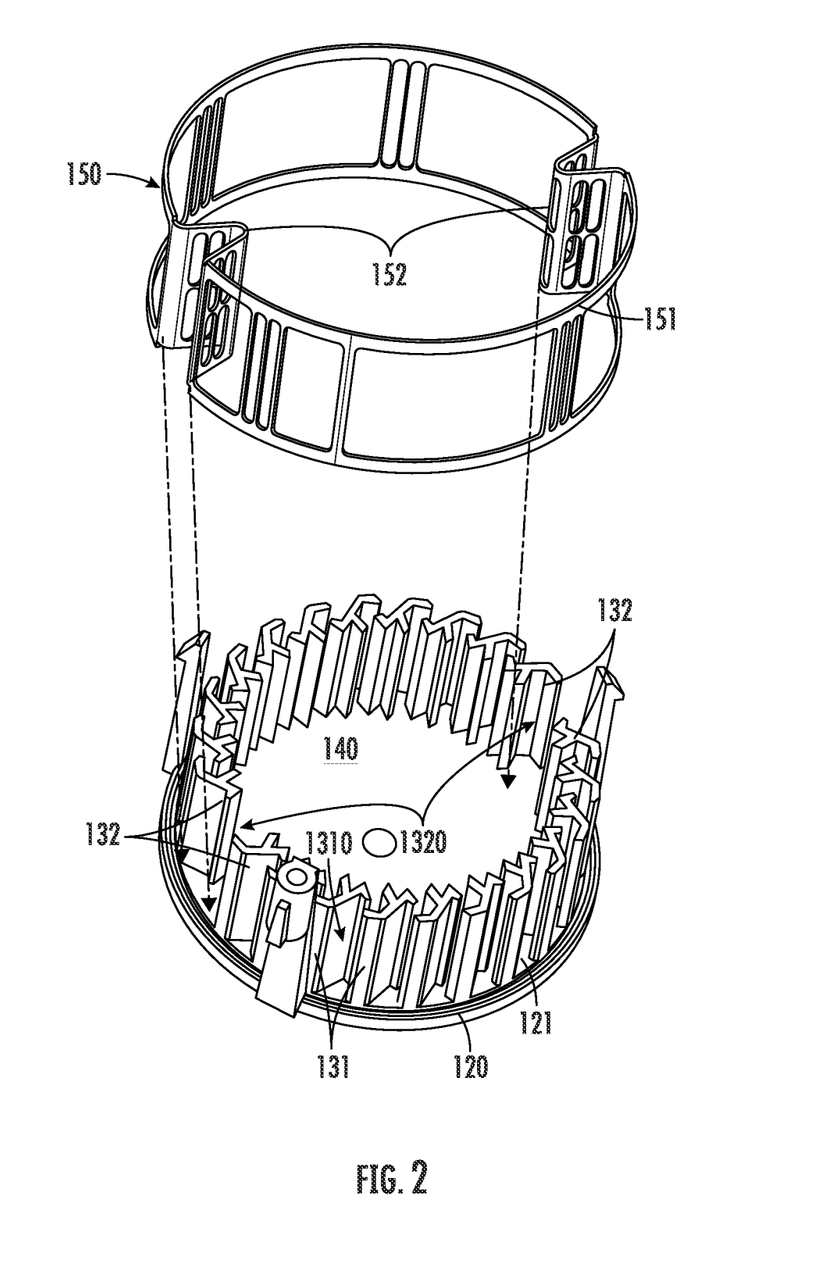
FIG. 2 is an exploded perspective view of a portion of the exemplary detection chamber of FIG. 1, illustrating an exemplary corrugated bug screen separated from an exemplary upper cover, in accordance with embodiments.

With reference to FIGS. 1 and 2, a detection chamber assembly 101 is provided and includes an upper cover 110 (commonly referred to as an optical cover) and a lower cover 120. As shown, detection chamber assembly 101 or either the upper cover 110 itself or the lower cover 120 itself may include a plurality of louvers 130 (the louvers 130 may be attached to or formed together with the upper cover 110 or the lower cover 120). The upper and lower covers 110 and 120 can be, but are not required to be, annular or substantially circular. For purposes of clarity and brevity, the following description will relate to the cases in which the upper and lower covers 110 and 120 are substantially circular.

As shown in FIG. 2, the louvers 130 may be arranged circumferentially about the respective peripheries 111,121 of the upper cover 110 and the lower cover 120 to define a chamber 140 between the upper cover 110 and the lower cover 120 (bound circumferentially within the louvers 130). The louvers 130 may each be provided as static elements with somewhat complex geometries and include first pairs of louvers 131 and at least one or more second pair of louvers 132. It should be appreciated that each respective first pair of louvers 131 may be separated from one another by a defined first space 1310, and each respective second pair of louvers 132 may be separated from one another by a defined second space 1320. As will be described below, the second space 1320 may be greater (i.e., wider than) the first space 1310 in certain instances. For purposes of clarity and brevity, the following description will relate to the cases in which the louvers 130 include multiple first pairs of louvers 131 and two pairs of second louvers 132, although it is envisioned that the detection chamber assembly 101 described herein may include any number of first pairs of louvers 131 and any number of second pairs of louvers 132.

As shown in FIG. 2, the multiple first pairs of louvers 131 may be arranged to define multiple first spaces 1310 therebetween (i.e., one first space 1310 between each respective pair of first louvers 131). Each of the multiple first spaces 1310 may be configured and disposed to permit fluidic ingress to the chamber 140. The two pairs of second louvers 132 may be arranged to define two second spaces 1320 therebetween (i.e., one second space 1320 between each respective pair of second louvers 132). Each of the second spaces 1320 may be wider than any of the first spaces 1310 and may be configured and disposed to permit fluidic ingress to the chamber 140.

Figure 4:
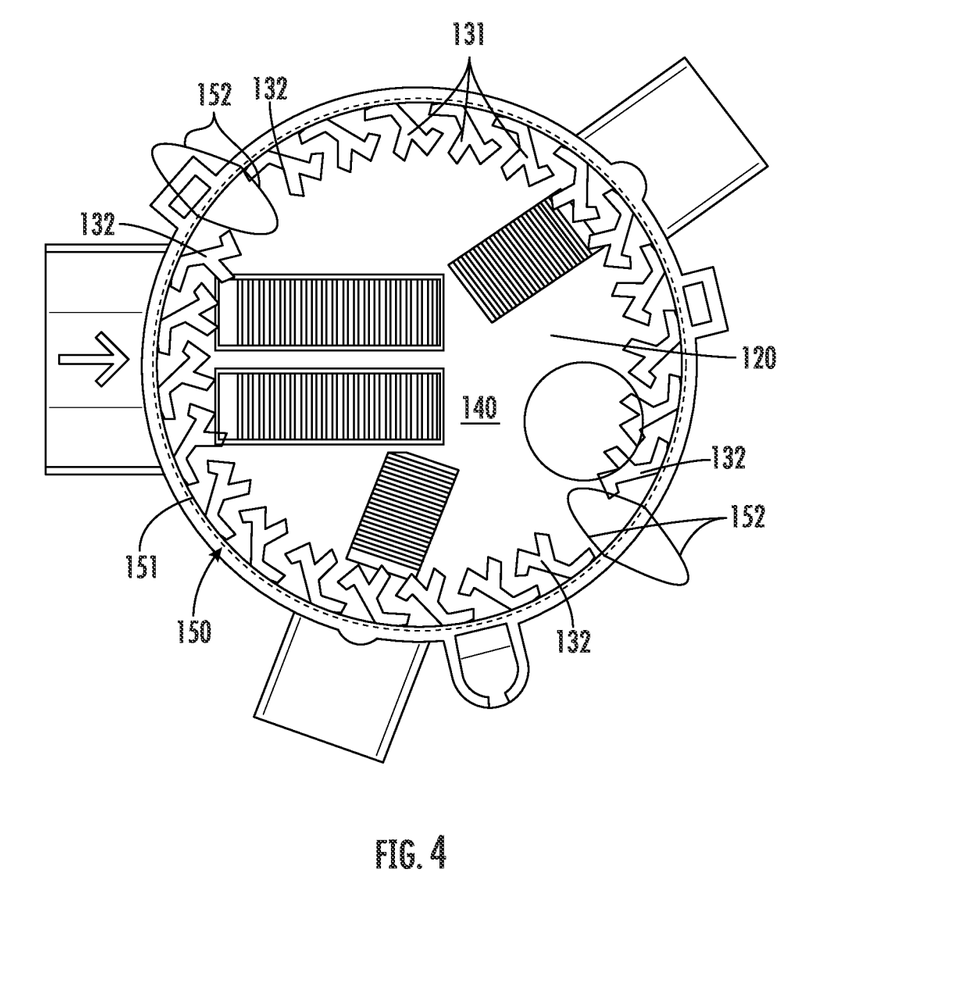
FIG. 4 is a top-down view illustrating the exemplary detection chamber assembly of FIG. 1 with an exemplary corrugated bug screen in accordance with embodiments.
Figure 5:
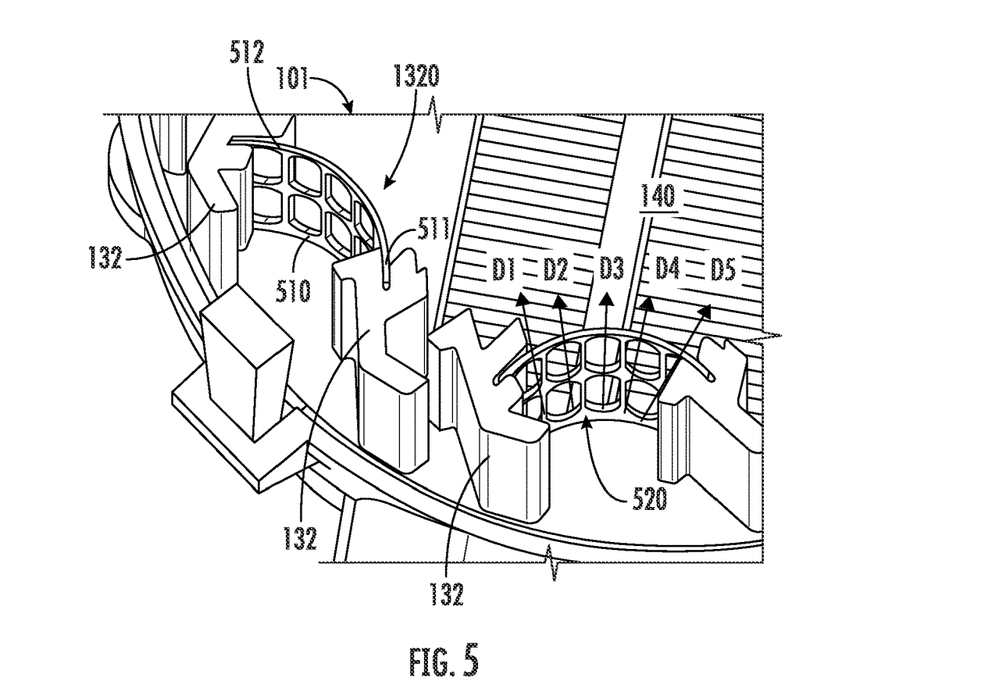
FIG. 5 is an enlarged perspective view of a portion of the exemplary detection chamber assembly of FIG. 1 with two exemplary corrugated bug screens, each respectively disposed between a pair of louvers, in accordance with alternative embodiments.
Figure 6:
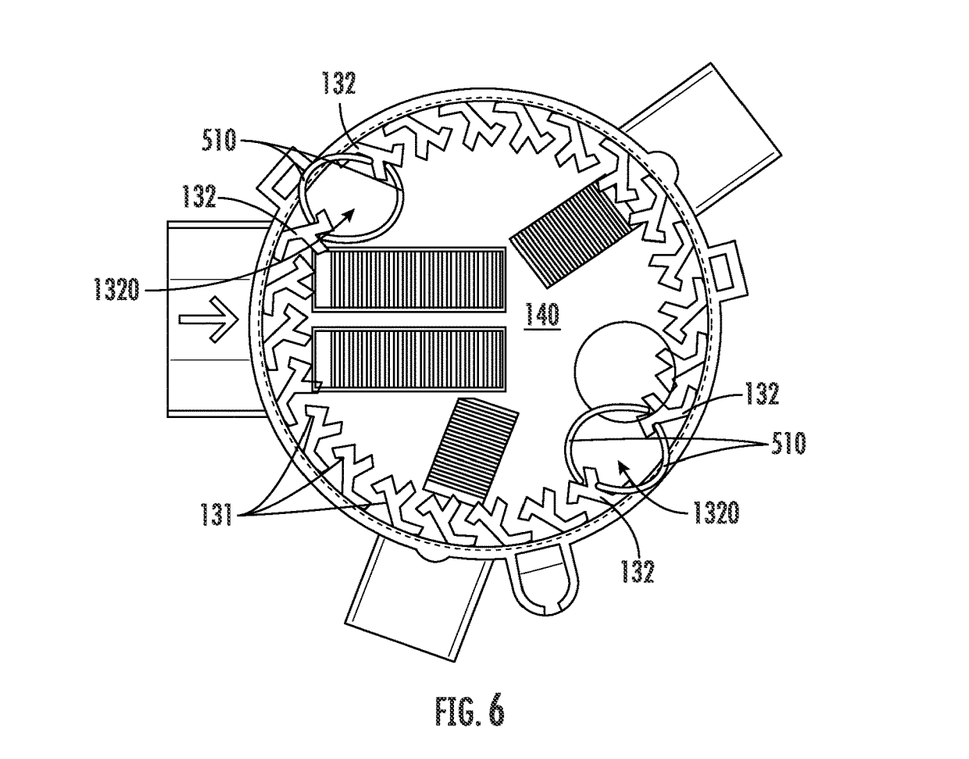
FIG. 6 is a top-down view illustrating exemplary corrugated bug screens disposed between pairs of louvers in accordance with alternative embodiments.

The detection chamber assembly 101 further includes at least one corrugated bug screen 150 (also 510, see FIG. 5). It will be appreciated that the corrugated bug screen 150, 501 described herein may be provided in multiple configurations. A first configuration of the corrugated bug screen 150 is shown in FIGS. 1-4, and a second configuration of the corrugated bug screen 510 is shown in FIGS. 5-6.

The first embodiment of the corrugated bug screen 150 includes a body 151 that is disposed about the louvers 130 and a mesh corrugation feature 152. The mesh corrugation feature 152 can be provided as one, two or more than two mesh corrugation features 152. It is to be understood that the following description will relate to the cases in which two mesh corrugation features are provided in correspondence with the two second spaces 1320. Each mesh corrugation feature 152 may be coupled to the body 151 at a corresponding one of the two second spaces 1320 to permit fluidic ingress to the chamber 140 and to inhibit bug ingress to the chamber 140.

As shown in FIGS. 1-4, depicting the first configuration of the corrugated bug screen 150, the body 151 of the corrugated bug screen 150 may be substantially circular and configured to tightly fit about or around the louvers 130 (e.g., between the upper cover 110 and the lower cover 120). In these or other cases, the mesh corrugation features 152 can be respectively disposed in positional correspondence with each corresponding one of the second spaces 1320.

Figure 3:
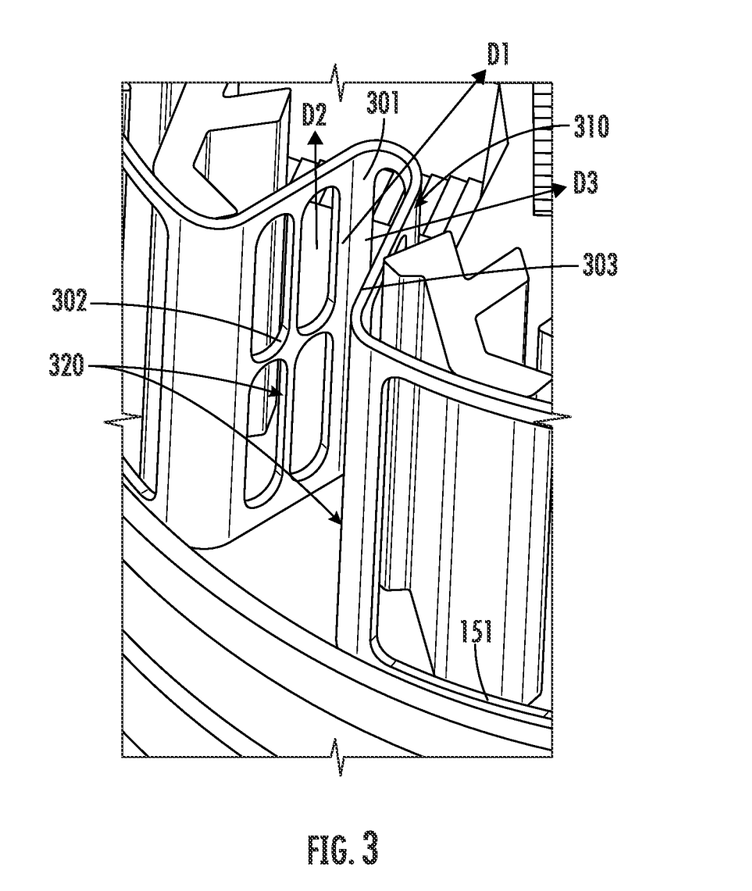
FIG. 3 is an enlarged perspective view of a portion of the exemplary corrugated bug screen and a portion of the exemplary upper cover of FIG. 2 assembled in accordance with embodiments.

With continued reference to FIGS. 1 and 2 and with additional reference to FIG. 3, each of the mesh corrugation features 152 can include a tip 301 and first and second tapered sidewalls 302 and 303 extending in opposite directions from the tip 301 to the body 151. As shown in FIG. 3, the tip 301 and the corners between the body 151 and the first and second tapered sidewalls 302 and 303 can be curved in certain instances. In accordance with embodiments, each of the mesh corrugation features 152 permits fluidic ingress to the chamber 140 in a first direction D1 through the tip 301 and in second and third directions D2 and D3 through the first and second tapered sidewalls 302 and 303, respectively. In accordance with further embodiments, each of the mesh-corrugation features 152 can include a columnar lattice structure 310 at the tip 301 (i.e., a column of openings separated by a horizontal crossbar) and a row-columnar lattice structure 320 at the first and second tapered sidewalls 302 and 303 (i.e., rows and columns of openings separated by crisscrossing vertical and horizontal crossbars).

With reference to FIG. 4 and in accordance with alternative embodiments, each of the mesh corrugation features 152 can extend radially inwardly toward the chamber 140 or radially outwardly from the chamber 140.

With reference to FIG. 5, the detection chamber assembly 101 may include one or more of a second configuration of the corrugated bug screen 510 (i.e., between second louvers 132). The detection chamber assembly 101 illustrated in FIGS. 5 and 6 may be viewed as the same or similar to the detection chamber assembly 101 described above (e.g., the detection chamber assembly 101 may include one or more pair(s) of second louvers 132, etc.). The second configuration of the corrugated bug screen 510 (shown in FIGS. 5 and 6) may be supported at opposite ends thereof on each of the second pair of louvers 132 at each of the second spaces 1320. As with the first configuration of the corrugated bug screen 150 (shown in FIGS. 1-4), the second configuration of the corrugated bug screen 510 may be designed to permit fluidic ingress to the chamber 140 and to inhibit bug ingress to the chamber 140.

As shown in FIG. 5, when referring to the second configuration of the corrugated bug screen 510, the opposite ends of the corrugated bug screen 510 can be supported in slots 511 defined in each of the second louvers 132. Also, as shown in FIG. 5, each corrugated bug screen 510 can include a curved body 512 and be designed to permit fluidic ingress to the chamber 140 in multiple directions D1-D5 normal to corresponding sections of the curved body 512. In accordance with further embodiments, each corrugated bug screen 510 can include a row-columnar lattice structure 520 (i.e., rows and columns of openings separated by crisscrossing vertical and horizontal crossbars) along the curved body 512.

With reference to FIG. 6 and in accordance with alternative embodiments, each corrugated bug screen 510 can extend radially inwardly toward the chamber 140 or radially outwardly from the chamber 140.

Figure 7:
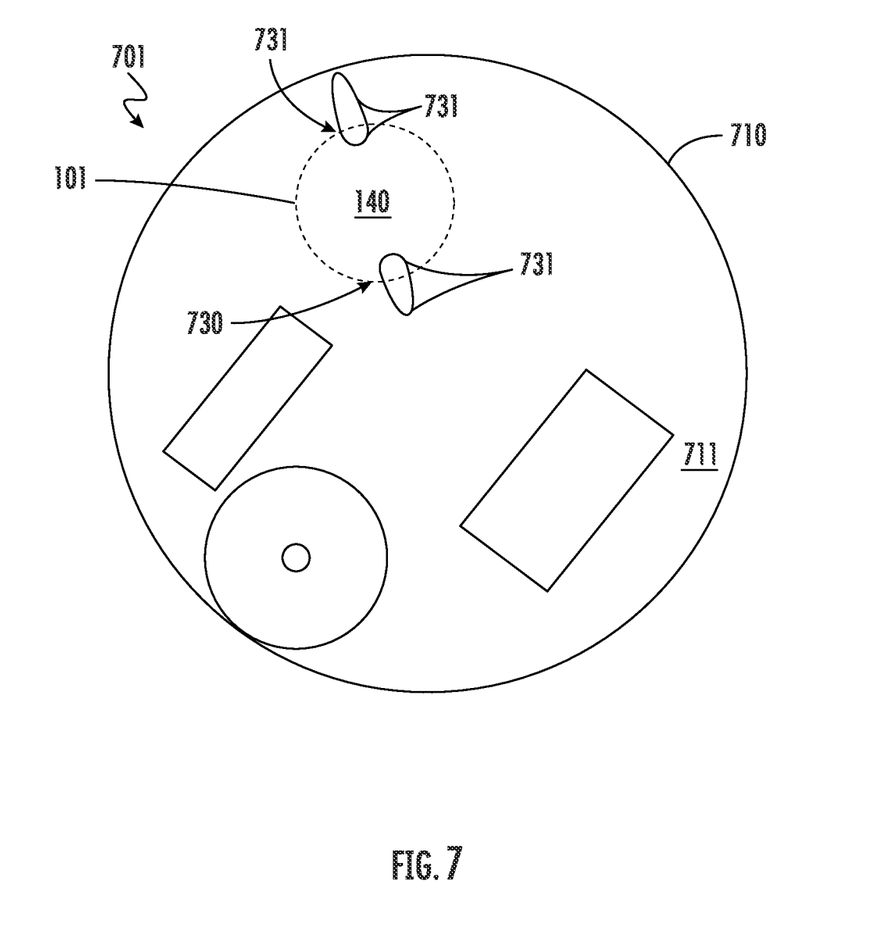
FIG. 7 is a top-down view of a portion of an exemplary smoke detector with a portion of the housing removed to illustrate an exemplary location for the detection chamber assembly of FIG. 1 in accordance with embodiments.

With reference to FIG. 7, a smoke detector 701 is provided, which includes a housing 710 defining an interior 711 and a detection chamber assembly 101, such as the detection chamber assembly 101 described above, which, as described above, includes a corrugated bug screen 150, 510. It should be appreciated that either of the configurations of the corrugated bug screen 150, 510 described above may be incorporated within the smoke detector 701 (although the corrugated bug screen is labeled 730 in FIG. 7).

As described above and shown in FIGS. 1-4, the corrugated bug screen 730 may include mesh corrugation features 731 (labeled 152 in FIGS. 1-4) at each of the second spaces to permit fluidic ingress to the chamber 140 and to inhibit bug ingress to the chamber 140. The corrugated bug screen 730 can include a body disposed about the louvers 130 with the mesh corrugation features 731 coupled to the body at the second spaces and either extending inwardly toward the chamber 140 or outwardly from the chamber 140 while remaining within the interior 711 of the housing 710. Alternatively, as described above and shown in FIGS. 5 and 6, the corrugated bug screen 730 (labeled 510 in FIGS. 5 and 6) can be supported on the second pairs of louvers at the second spaces and can either extend inwardly toward the chamber 140 or outwardly from the chamber 140 while remaining within the interior 711 of the external structure 710.

Technical effects and benefits of the present disclosure are the provision of a smoke detector with improved smoke entry and an enhanced ability to detection conditions of various fires in a surrounding environment. Improved fluidic flows will allow for easier qualification testing at regulatory agencies and for easier requalification of production samples.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A detection chamber assembly of a smoke detector, the detection chamber assembly comprising:
   upper and lower covers;
   louvers arranged with the upper and lower covers to define a chamber bound between the upper and lower covers and the louvers, the louvers comprising:
   a first pair of the louvers defining a first space therebetween to permit fluidic ingress to the chamber, and
   a second pair of the louvers defining a second space therebetween to permit fluidic ingress to the chamber, the second space being wider than the first space; and
   a corrugated bug screen comprising a body disposed about the louvers and a mesh corrugation feature coupled to the body at the second space to permit fluidic ingress to the chamber at the second space and to inhibit bug ingress to the chamber at the second space, wherein the mesh corrugation feature extends from the body around the louvers of the second pair of the louvers and inwardly between the louvers of the second pair of the louvers toward the chamber.

2. The detection chamber assembly according to claim 1, wherein:

the louvers comprise multiple second pairs of louvers, each respectively defining second spaces therebetween, and the corrugated bug screen comprises multiple mesh corrugation features, each respective mesh corrugation feature coupled at corresponding ones of the multiple second spaces.

3. The detection chamber assembly according to claim 1, wherein the mesh corrugation feature comprises a tip and first and second tapered sidewalls extending from the tip to the body.

4. The detection chamber assembly according to claim 3, wherein the mesh corrugation feature permits fluidic ingress to the chamber in a first direction through the tip and in second and third directions through the first and second tapered sidewalls, respectively.

5. The detection chamber assembly according to claim 3, wherein the mesh-corrugation feature comprises:

a columnar lattice structure at the tip; and a row-columnar lattice structure at the first and second tapered sidewalls.

6. A detection chamber assembly of a smoke detector, the detection chamber assembly comprising:

an upper cover;

a lower cover;

louvers arranged with the upper and lower covers to define a chamber bound between the upper and lower covers and the louvers, the louvers comprising:

a first pair of the louvers defining a first space therebetween to permit fluidic ingress to the chamber, and a second pair of the louvers defining a second space therebetween to permit fluidic ingress to the chamber, the second space being wider than the first space and each of the louvers of the second pair of the louvers defining an inwardly facing slot; and a corrugated bug screen comprising a curved body and being supported at opposite sides of the curved body in the inwardly facing slot defined in each of the louvers of the second pair of the louvers at the second space such that the curved body extends inwardly toward the chamber to permit fluidic ingress to the chamber and to inhibit bug ingress to the chamber.

7. The detection chamber assembly according to claim 6, wherein:

the louvers comprise multiple second pairs of louvers, each respectively defining second spaces therebetween, each second space comprising one corrugated bug screen.

8. The detection chamber assembly according to claim 6, wherein the corrugated bug screen permits fluidic ingress to the chamber in multiple directions normal to corresponding sections of the curved body.

9. The detection chamber assembly according to claim 6, wherein the corrugated bug screen comprises a row-columnar lattice structure.

10. The detection chamber assembly according to claim 6, wherein the corrugated bug screen extends inwardly toward the chamber.

11. A smoke detector comprising:

a housing defining an interior in which a detection chamber assembly is operably disposed, the detection chamber assembly comprising:

upper and lower covers;

louvers arranged with the upper and lower covers to define a chamber bound between the upper and lower covers and the louvers, the louvers comprising:

a first pair of the louvers defining a first space therebetween to permit fluidic ingress to the chamber, and a second pair of the louvers defining a second space therebetween to permit fluid ingress to the chamber, the second space being wider than the first space; and a corrugated bug screen disposed at the second space to extend inwardly between the second pair of the louvers toward the chamber to permit fluidic ingress to the chamber and to inhibit bug ingress to the chamber.

12. The smoke detector according to claim 11, wherein the corrugated bug screen comprises:

a body disposed about the louvers; and a mesh corrugation feature coupled to the body at the second space and extending inwardly toward the chamber, wherein the mesh corrugation feature extends from the body around the louvers of the second pair of the louvers and inwardly between the louvers of the second pair of the louvers toward the chamber.

13. The smoke detector according to claim 11, wherein:

each of the louvers of the second pair of the louvers defines an inwardly facing slot, and the corrugated bug screen comprises a curved body that is supported at opposite sides of the curved body in the inwardly facing slot defined in each of the louvers of the second pair of the louvers at the second space such that the curved body extends inwardly toward the chamber.

\* \* \* \* \*